United States Patent [19]

Arnold

[11] Patent Number: 4,725,328
[45] Date of Patent: Feb. 16, 1988

[54] SINGLE PLY ROOFING APPLICATOR

[76] Inventor: Warren Arnold, 515 Rork Rd., Hastings, Mich. 49058

[21] Appl. No.: 836,689

[22] Filed: Mar. 6, 1986

[51] Int. Cl.$^4$ .......................... B27G 11/02; B44C 7/00
[52] U.S. Cl. ..................................... 156/380.9; 52/746;
156/64; 156/71; 156/82; 156/244.27; 156/295;
156/299; 156/308.2; 156/309.6; 156/309.9;
156/497; 156/543; 156/577; 156/579
[58] Field of Search ..................... 52/746; 156/64, 295,
156/71, 577, 82, 579, 308.2, 309.6, 380.9, 309.9,
244.27, 299, 497, 543

[56] References Cited
U.S. PATENT DOCUMENTS

| | | | |
|---|---|---|---|
| 2,367,725 | 1/1945 | Lindh et al. | 156/309.6 |
| 4,061,519 | 12/1977 | Hammer | 156/295 |
| 4,087,309 | 5/1978 | Lang | 156/82 |

Primary Examiner—John J. Gallagher
Attorney, Agent, or Firm—Price, Heneveld, Cooper, DeWitt & Litton

[57] ABSTRACT

An applicator for applying sheet material to roofs, floors and the like that includes a frame with a mount for a roll supply of the sheet material. A heater heats the lower surface of the sheet material as it is applied and a seam heater heats the upper surface of an adjacent section of previously applied sheeting material as the subsequent sheet is applied in an overlapping relationship. A roller compresses the overlapping seam until plasticized or liquid roofing material extrudes therealong to provide a visual determination that a proper seal has been formed between the adjacent sections of material.

22 Claims, 7 Drawing Figures

SINGLE PLY ROOFING APPLICATOR

BACKGROUND OF THE INVENTION

The present invention relates to applicators for roofing material and the like, and in particular to applicators for roofing material of the sheet variety having a heat sensitive lower surface, such as bitumen sheeting.

One conventional type of material used for waterproofing roofs or other outdoor surfaces is a heat sensitive laminate bitumen sheeting. Typically such material is stored in a roll which is manually applied to the substrate by unrolling the sheet in slightly overlapping strips. The overlapping seam between adjacent sections of material is thereafter heat sealed or fused in order to provide a waterproof joint. Heretofore the sealing operation was performed manually by raising the upper edge of the overlapping section, heating the overlapping region with a handheld torch or burning unit and then sealing together the overlapping sections. This manual sealing process is both time consuming and difficult to determine if a proper seal has been affected at the overlapping seam.

In an attempt to alleviate problems associated with the manual application of such roofing material, roofing applicators of various types have been developed. Typically these applicators provide a mount for a roll of the roofing material and a heating unit. The heating unit heats the undersurface of the sheet material to a softened state as the material is unrolled in order to provide adhesion with the substrate. Although such applicators are adequate to lay out the sheet material, these devices still normally require an operator to return to manually heat and seal the overlapping seam between adjacent sections in the manner previously described.

In an attempt to reduce the time and effort necessary for the manual seam sealing process, as well as to insure that a proper seal is created between the overlapping sections, various independent roofing material sealing devices have been developed. Such devices typically include a framework that supports a burner or burners and a generally horizontal bracket or flange that is fitted beneath the overlapping edge of the upper section of roofing material. As the device is moved along the overlapping seam, the bracket first raises the upper section and the burner units than heat the seam region beneath the raised material. Thereafter a roller presses the overlapping seam together to form a seal. Although such sealing devices operate adequately, the operator is still required to retrace the previously laid path of roofing material, requiring either additional operators or additional time for the application and sealing process.

SUMMARY OF THE INVENTION

The present invention provides an applicator for sheet material of the type used for roofing which has a heat sensitive lower surface and is applied in overlapping relationship with adjacent sections so as to form an overlapping seam. The applicator includes a transportable support frame having a mount for a supply of the roofing material. A heater heats the lower surface of the roofing material as it is applied. Prior to application of the sheet material, a seam heater heats the upper surface of the previously applied adjacent section of material at an overlapping edge. An elongated roller presses the sheeting material against the substrate, and a roller compresses the seam in order to create a watertight seal between adjacent sections. As the roller compresses the overlapping seam, plasticized or liquid roofing material extrudes along the seam so that during the application process the operator visually determines that an appropriate seal is being formed.

These and other features, advantages, results and objects of the invention will be recognized by one skilled in the art from the specification and claims which follow and the drawings appended herewith.

DETAILED DESCRIPTION OF THE PREFERRED EMBODIMENTS

Figure 3:
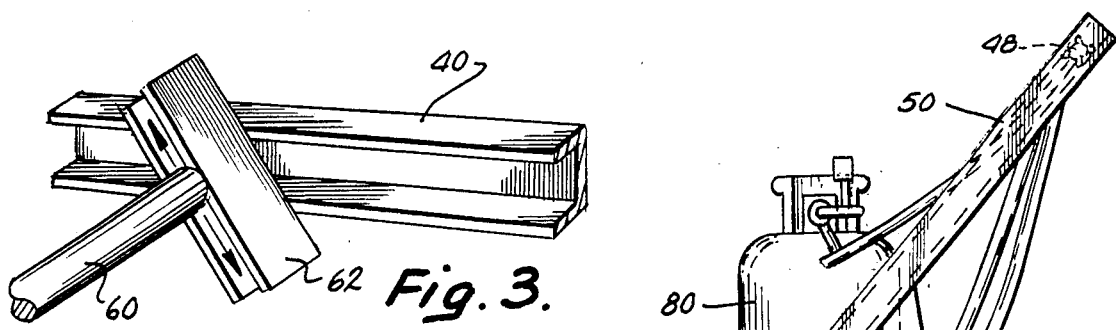
FIG. 3 is a fragmentary, perspective view of the roofing material roll mounting region indicated by Arrow III of FIG. 1.
Figure 2:
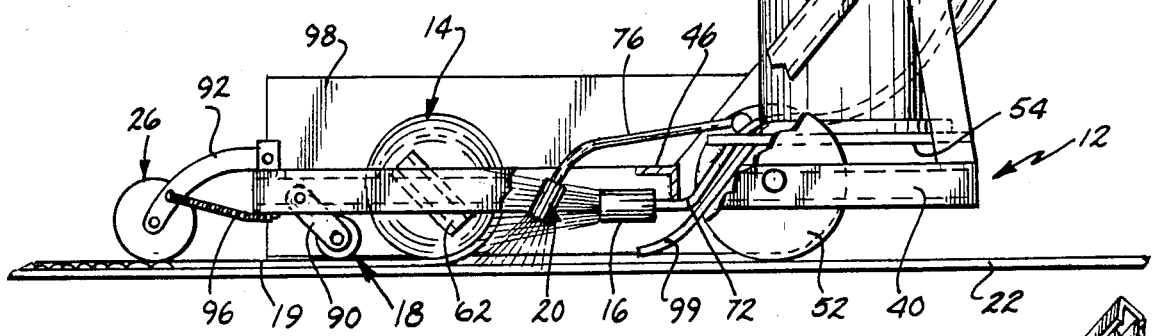
FIG. 2 is an elevational view partially broken away of the applicator device of FIG. 1.
Figure 1:
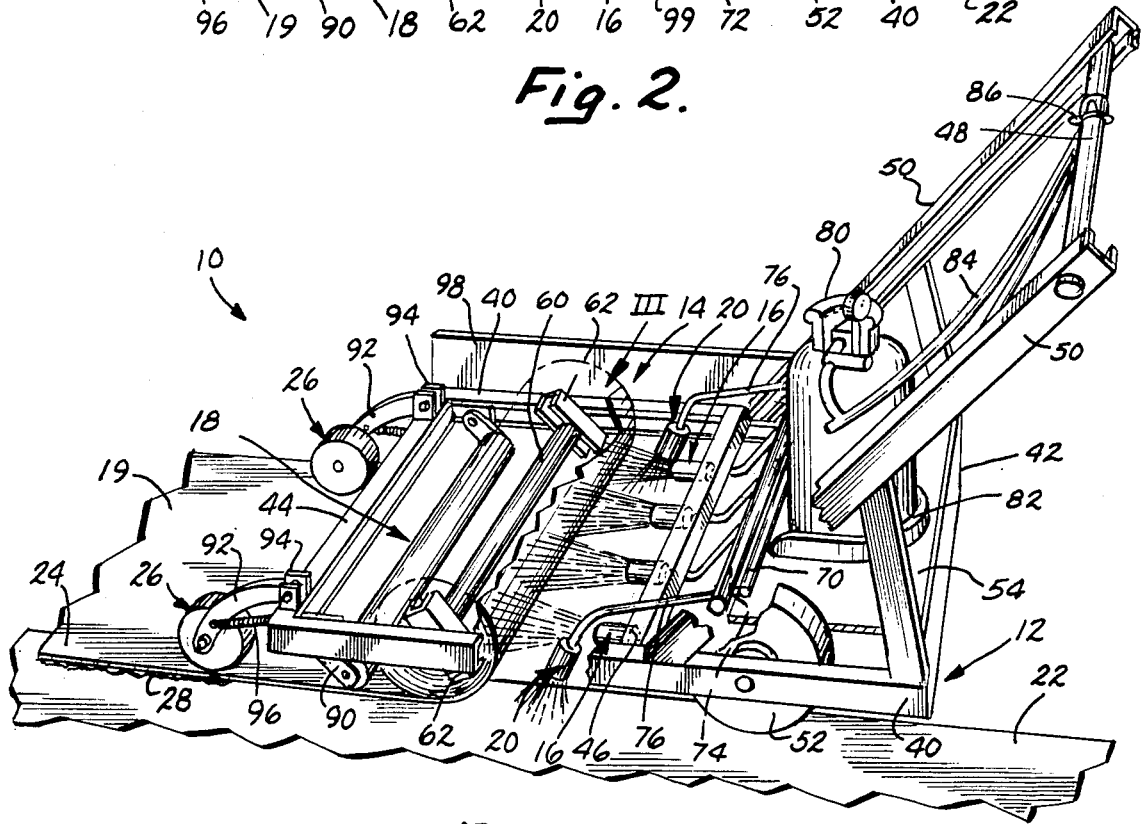
FIG. 1 is a perspective view partially broken away of a roofing material applicator device embodying the present invention.

The present invention is embodied in an applicator for sheet material of the type having a heat sensitive lower surface, such as bitumen roofing material or the like, a preferred form of which is shown in FIG. 1 and referenced generally by the numeral 10. Applicator 10 includes a transportable support frame 12 on which a roll 14 of the roofing material is mounted. A set of undersurface heating units 16 heat the lower surface of roofing material 19 prior to application to the substrate. An elongated roller 18 presses the section of roofing material 19 against the substrate as it is reeled off of roll 14. Prior to application of roofing material 19, a set of seam heating units 20 heat the upper surface of a previously laid section of roofing material 22 along its outer edge. Roofing material 19 is applied in an overlapping relationship to adjacent section 22 in order to form an overlapping seam 24 in the region previously heated by seam heating unit 20. A pair of seam rollers 26 contact and compress seam 24 so that a bead of plasticized or liquid bituminous roofing material 28 is extruded along seam 24. The operator therefore visually determines that an appropriate seal is being formed at seam 24 at the same time that roofing material 19 is being applied to the substrate.

Frame 12 provides a support for the various operative elements of applicator 10, and includes a pair of side beams 40 joined by a front beam 42 and a rear beam 44. A cross beam 46 extends between side beams 40 and is used to mount undersurface heating units 16. A handle 48 is secured to side beams 40 by a pair of struts 50, which permits an operator to draw applicator 10 across the surface to be covered as roofing material 19 plays out behind applicator 10. A pair of forward wheels 52 are mounted on an axle extending between side beams 40. Forward wheels 52 are located between front beam 42 and cross beam 46, so as to be located forward of the region or zone at which roofing material 19 is applied.

A platform 54 is supported on frame 12 between wheels 52, which provides a support platform for the heater unit fuel supply as described below. Frame 12 has a welded angle iron construction in order to provide a heavy duty cart construction that is able to support a substantial fuel supply, roofing material roll 14 and the applicator elements.

Figure 4:
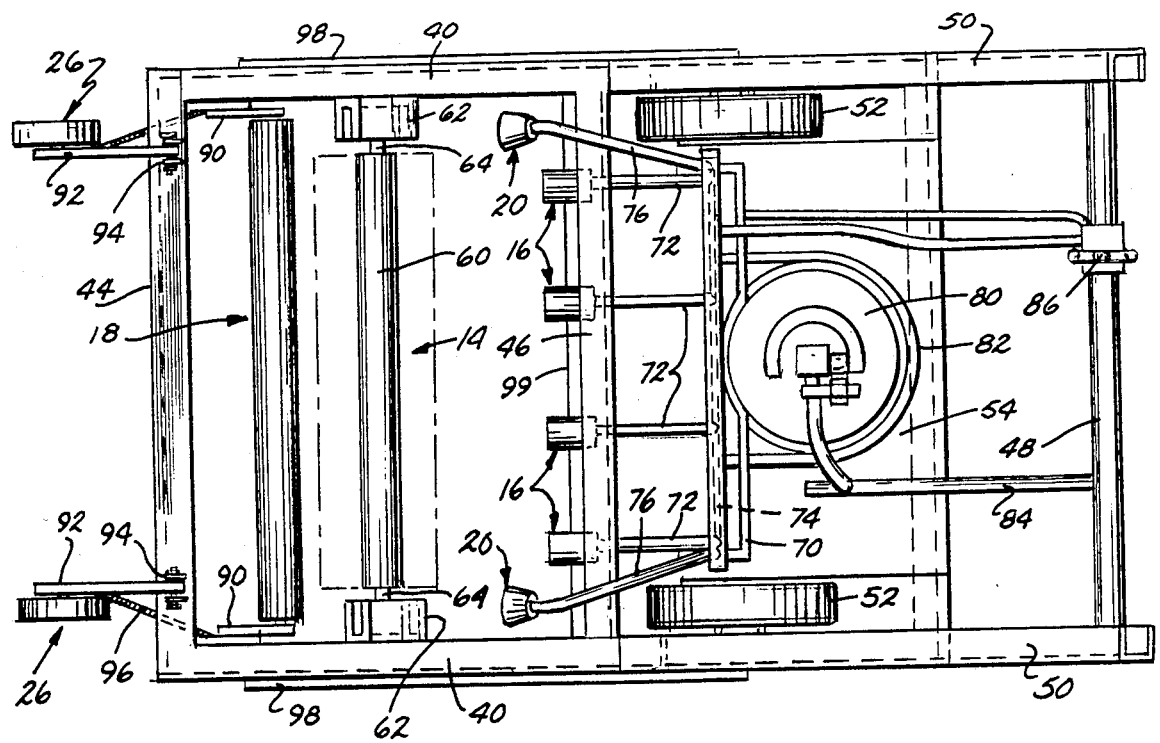
FIG. 4 is a top plan view of the applicator device of FIG. 1.

Roofing material roll 14 provides a supply of the sheet material that is replaceably mounted on a spindle 60. A pair of linear guide tracks 62 are welded to side beams 40 rearwardly of cross beam 46 in order to open inwardly toward each other. Spindle 60 includes narrowed end posts 64 (FIG. 4) that are slidably and rotatably received within guide tracks 62 so that spindle 60 spans cross beams 40. Guide tracks 62 angle forwardly and downwardly, preferably at an angle of approximately 45 degrees. Due to the angle of guide track 62, with spindle 60 slidably received in guide tracks 62 roll 14 is mounted to be drawn forward toward undersurface heating units 16 as the diameter of roll 14 is reduced. Thus, even though the diameter of roofing material roll 14 is constantly diminishing, spindle 60 lowers roll 14 in order to maintain contact with the substrate, and spindle 60 also slides generally forwardly in order to maintain the outer surface of roll 14 at a generally consistent spacing from undersurface heating units 16.

As shown in FIG. 1, four undersurface heating units 16 each provide a cylindrical burning nozzle that is oriented generally horizontally and directed toward the undersurface of roll 14 as the sheeting material is dispensed. An undersurface heater manifold 70 extends between four lead tubes 72 that supply fuel to undersurface heating units 16. Lead tubes 72 preferably are rigid piping secured to cross beam 46 which maintains the orientation of heating units 16. A separate seam heating manifold 74 extends parallel to manifold 70 and distributes fuel to the two seam heating units 20 through lead tubes 76. Lead tubes 76 extend rearwardly of undersurface heating units 16 and bend downwardly so as to angle seam heating units 20 in a generally downwardly directed orientation. Seam heating units 20 are conventional flattened burning nozzles that are spaced to the two opposite sides of the frame 12. The narrowed nozzles of seam heating units 20 concentrate their heating output in a region along which the edge of roofing material 19 will be applied.

A conventional fuel tank 80 is mounted on platform 54. A raised flange on platform 54 forms a seat for fuel tank 80 and prevents tank 80 from inadvertently sliding off of frame 12. Fuel tank 80 is equipped with a conventional regulator valve that is coupled to a flexible fuel line 84. Fuel line 84 runs to a control valve 86 mounted on frame handle 48 in order to be readily accessible to an operator. Fuel lines 87 and 88 extend from control valve 86 and couple to undersurface heater manifold 70 and seam heater manifold 74, respectively. Control valve 86 operates in a conventional fashion to permit fuel flow from tank 80 to heating units 16 and 20 while the fuel tank regulator adjusts the rate of flow in a conventional manner. Tank 80 may contain any appropriate fuel, such as liquified petroleum gas, propane gas or butane as a fuel source.

Undersurface heating units 16 and seam heating units 20 are also preferably provided with conventional igniter systems (not shown) which ignite the discharged fuel to provide an open flame heating unit. Alternatively, control valve 86 may be set to provide a predetermined minimum flow of fuel to the heating units when in the closed position. This minimum flow provides sufficient fuel for a pilot light effect, yet does not provide sufficient fuel for general heating of the roofing material or substrate. Also, seam heaters 20 may alternatively be provided with separate fuel lines or a diverter valve in manifold 74. Seam heaters 20 may therefore be operated independently so as to selectively provide downwardly directed heating at only one side of applicator 10.

Alternatively, a radiant heater unit (not shown) is mounted to extend between side beams 40 and is positioned laterally adjacent roll 14. The radiant heater heats the undersurface of roofing material 19 as it is played off of roll 14. The radiant heater may therefore be used in place of the open flame blower undersurface heating units 16, or alternatively as a supplement thereto.

Elongated roller 18 is mounted to the rear of frame 12 and extends between side beams 40. Roller 18 is mounted by a pair of end brackets 90 welded to side beams 40. Roller 18 is a weighted cylindrical shaft that extends substantially the entire width of roofing material 19 as the material is applied to the substrate. Since supply roll 14 is mounted by slidable spindle 60 and is therefore not vertically fixed to frame 12, roller 18 also provides a front roller suspension for the support of frame 12. The weight of frame 12 therefore combines with the weight of roller 18 to compress the sheet of roofing material 19 against the substrate in order to affect a solid bond along the entire width of the sheet material.

Seam rollers 26 are each mounted by a pivotal bracket 92 so as to extend rearwardly of rear beam 44. Each pivotal bracket 92 is mounted to rear beam 44 by a pivot 94 that permits seam roller 26 to be raised up out of contact with the lower supporting surface. Seam rollers 26 are spaced toward the sides of frame 12 so as to contact the region that has been heated by seam heating units 20 after heating units 20 have passed thereover. A spring 96 is coupled between each beam 40 and the outboard end of each pivot bracket 92 in order to bias seam roller 26 downwardly against the lower supporting surface. Pivotal bracket 92 may be provided with an overcentering action to permit each pivotal bracket 92 to be selectively raised and maintained in a raised, overcentered position out of contact with the lower supporting surface. Each seam roller 26 may therefore be selectively engaged with the lower supporting surface so that only one seam roller 26 will contact and compress corresponding seam 24.

Extending along the outer side of each side beam 40 is a wind deflector panel 98. Panels 98 extend down beneath side beams 40 so that their lower edges are positioned closely adjacent the surface to be covered. Panels 98 also extend upwardly from side beams 40 sufficiently to prevent wind from interfering with the open flame heating of roofing material 19. Alternatively, an additional forward wind deflecting panel 99 depends from platform 54 beneath seam heating units 20. Forward wind deflecting panel 99 also blocks strong wind currents from the front of applicator 10 and therefore combines with side wind deflector panels 98 to form a protective cowling about heating units 16 and 20.

In use, an operator mounts a roll 14 of roofing material 19 on spindle 60 so as to be fed down beneath the roll and extend backwardly beneath elongated roller 18. The end of the sheet of roofing material 19 is adhered to the substrate by a handheld burning unit. Thereafter, the operator draws applicator 10 across the area to be covered while operating valve 86 in order to heat the lower surface of roofing material 19 as it is dispensed from roll 14. While applying the first section of roofing material both seam heating units 20 are activated in order to heat the substrate in the region of the edges of the roofing material section. Thereafter, applicator 10 is manipulated to apply roofing material 19 so as to overlap with the adjacent roofing material section 22 and thus provide the overlapping seam 24 necessary to affect proper sealing for waterproofing purposes. One seam heating unit 20 heats the upper surface of adjacent roofing material section 22 prior to roofing material 19 being applied. Roller 18 presses roofing material 19 against the substrate, while spring biased seam roller 26 compresses seam 24 together.

As the operator draws applicator 10 along the edge of adjacent roofing material section 22, the operator visually determines that plastic or liquid bitumen roofing material is extruded along seam 24 due to the compression by seam roller 26. This extrusion indicates that an appropriate seal is being formed and that heating units 16 and 20 are operating at the proper rate for the rate of application of roofing material 19.

Figure 5:
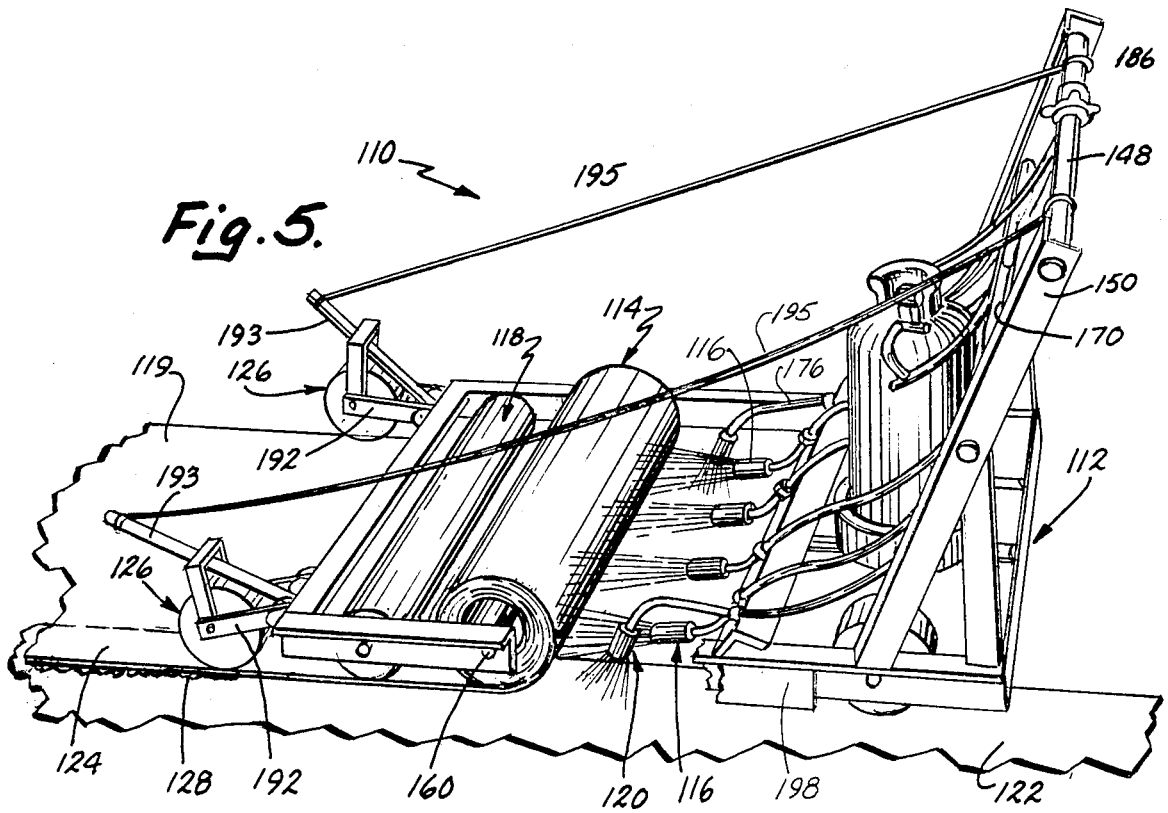
FIG. 5 is a perspective view partially broken away of another roofing material applicator device forming a second embodiment of the invention.
Figure 7:
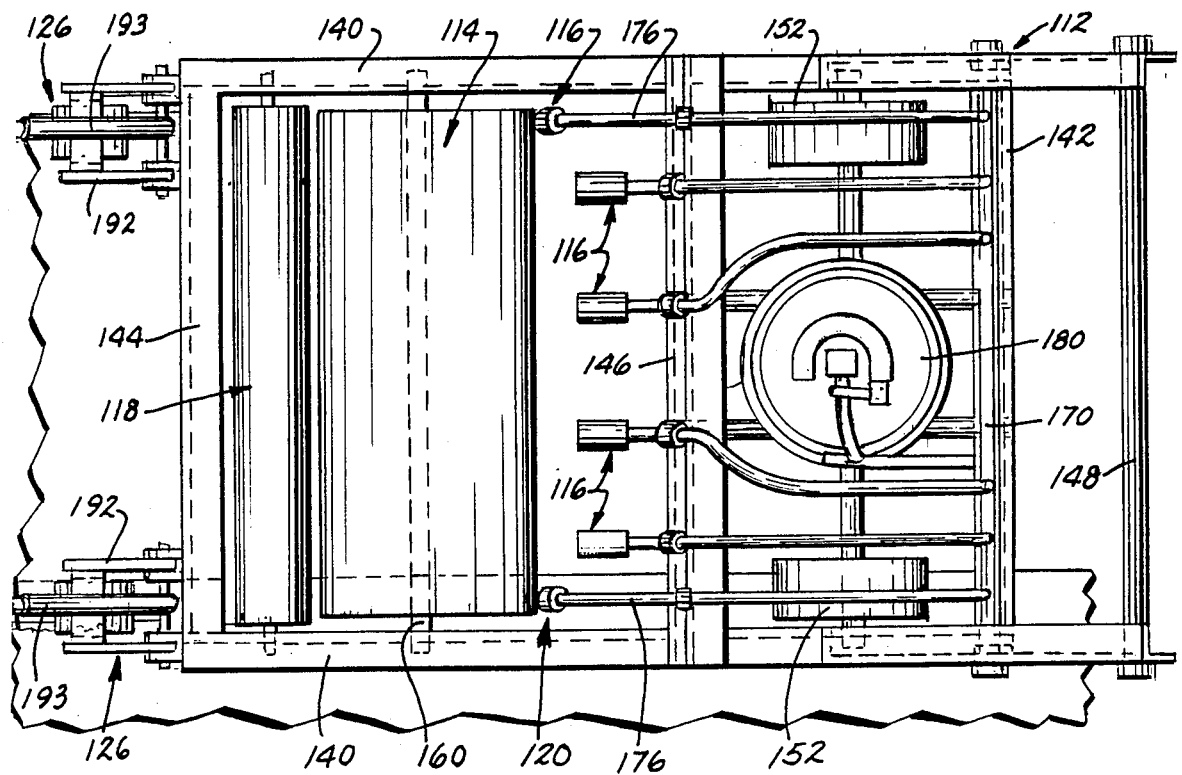
FIG. 7 is a top plan view of the applicator device of FIG. 5.
Figure 6:
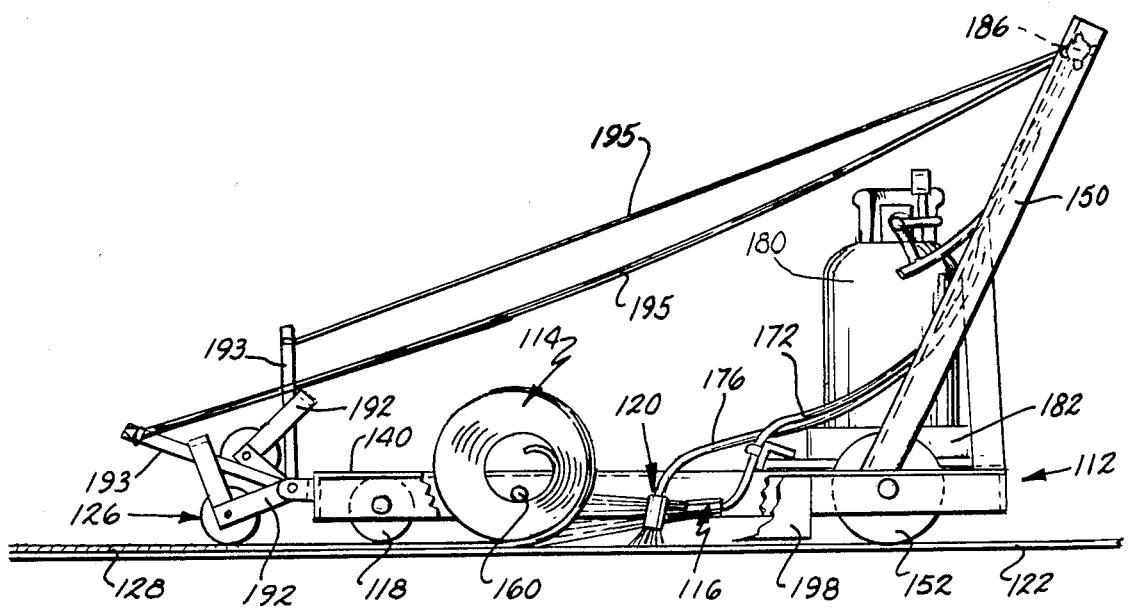
FIG. 6 is a side elevational view partially broken away of the applicator device of FIG. 5.

Shown in FIGS. 5 through 7 is an alternative preferred embodiment of the roofing material applicator referenced generally by the reference numeral 110. Applicator 110 is substantially similar to applicator 10 shown in FIGS. 1 through 4, with the exceptions noted below. Similar elements have therefore been given a similar reference numeral, with the exception of the prefix one hundred.

Applicator 110 includes a rigid frame 112 on which is mounted a roll 114 of roofing material sheeting. Four undersurface heating units 116 are directed generally horizontally at the undersurface of the material as it is fed off of roll 114. An elongated roller 118 compresses the roofing material 119 after it has been dispensed from roll 114. A pair of seam heating units 120 are directed generally downwardly and are spaced at either side of frame 112 in order to heat the upper surface of the previously laid adjacent roofing section 122. The roofing material section 119 is applied in an overlapping relationship to adjacent section 122 to form an overlapping seam 124. A pair of seam rollers 126 are spaced on frame 112 so as to contact the region heated by seam heating units 120, and thereby contacts and compresses overlapping seam 124. Frame 140 is generally rectangular and includes a handle 148 by which applicator 110 is drawn over the surface to be covered. The mount for roofing material roll 114 includes a narrow rod 160 that slides axially through apertures on frame 112 so as to extend between the two sides of the frame. Rod 160 merely extends through the central opening of roll 114, and therefore rod 160 does not slide downwardly or forwardly as the diameter of roll 114 decreases.

Undersurface heating units 116 and seam heating units 120 are substantially similar to those of applicator 10 described above, with the exception that a common manifold 170 is mounted beneath handle 148. Lead tubes 172 and 176 extend up to the common manifold 170. Fuel tank 180 provides fuel to burners 116 and 120 as described above in relation to fuel tank 80.

Seam rollers 126 may be selectively raised independently. Seam rollers 126 are each mounted on a pivotal bracket assembly 192 that provides a wheel-like mounting for seam roller 126. An upwardly angled post 193 is secured to each roller bracket assembly 192 in order to provide a lever for raising seam roller 126. A lift cable 195 extends between handle 148 and each angled post 193. Lift cable 195 permits the operator to raise each seam roller 126 individually from his station forward of device 110 by simply grasping cable 195 and pulling back on post 193.

It will be understood that the above is merely a description of the preferred embodiments and that one skilled in the art will recognize that various modifications or improvements may be made without departing from the spirit of the invention disclosed herein. The scope of protection afforded is to be determined by the claims which follow and the breadth of interpretation that the law allows.

The embodiments of the invention in which an exclusive property or privilege is claimed are as follows.

1. An applicator for sheet material of the type having a heat sensitive lower surface that is applied in an overlapping relationship with adjacent sections of sheet material to form an overlapping seam therebetween, comprising:
a transportable support frame defining a sheet material application zone;
means for mounting a supply of said sheet material and said frame and for the controlled dispensing of said sheet material at said application zone;
lower surface heating means for heating said lower surface of said sheet material at said application zone;
first seam heating means disposed at an edge of said application zone for heating the upper surface of an adjacent section of previously applied sheet material; and
a first seam compressing element mounted on said frame and disposed to contact and compress the region heated by said first seam heating means after said seam heating means has been transported thereover, whereby as said applicator is transported over a substrate to be covered, said sheet material is heated and dispensed at said application zone in an overlapping relationship forming a seam with an adjacent section of roofing material, and pressure from said seam compressing element on the heated seam extrudes a bead of liquified roofing material from the seam thereby providing a visual indication that the seam is watertight as the seam is formed.

2. The applicator of claim 1, further comprising:
a sheet roller extending substantially across said application zone and disposed to contact said sheet material after said sheet material is dispensed therethrough.

3. The applicator of claim 2, further comprising:
a second seam heating means disposed at an opposite edge of said application zone from said first seam heating means, and a second seam compressing element mounted on said frame and disposed to contact and compress the region heated by said second seam heating means after said second seam heating means has been transported thereover.

4. The applicator of claim 3, wherein:
said first seam heating means and said second seam heating means are selectively operable.

5. The applicator of claim 4, further comprising:
a wind screen extending along at least one side of said application zone, said wind screen positioned closely adjacent the substrate to be covered.

6. The applicator of claim 5, wherein:
said seam compressing elements are rollers and said rollers are spring biased into engagement with said seam.

7. The applicator of claim 6, wherein:
said supply mounting means is a supply roller slidably mounted in guide tracks on said frame.

8. The applicator of claim 7, wherein:
said lower surface heating means is located forwardly of said supply roller, and said guide tracks angle forwardly downwardly.

9. The applicator of claim 1, further comprising:
a second seam heating means disposed at an opposite edge of said first seam application zone from said first seam heating means, and a second seam compressing element mounted on said frame and disposed to contact and compress the region heated by said second seam heating means after said second seam heating means has been transported thereover.

10. The applicator of claim 9, wherein:
said first seam heating means and said second seam heating means are selectively operable.

11. The applicator of claim 1, further comprising:
a wind screen extending along at least one side of said application zone, said wind screen positioned closely adjacent the substrate to be covered.

12. The applicator of claim 1, wherein:
said sheet material supply mounting means is a roller slidably mounted in guide tracks on said frame.

13. The applicator of claim 12, wherein:
said lower surface heating means is located forwardly of said supply roller, and said guide tracks angle forwardly downwardly.

14. The applicator of claim 1, wherein:
said first seam heating means comprises open flame burning elements, and said lower surface heating means comprises open flame burning elements.

15. The applicator of claim 14, wherein:
said lower surface heating means further comprises a radiant heater element.

16. The applicator of claim 1, wherein:
said lower surface heating means comprises a radiant heater element.

17. An applicator for roofing material of the type having a heat sensitive lower surface that is applied to a substrate in overlapping relationship with adjacent sections of roofing material to form an overlapping seam therebetween, comprising:
a transportable support frame defining a roofing material application zone;
a roofing material feed assembly on said frame, said feed assembly including a supply roller mounted on said frame adapted to selectively secure a roll of roofing material to said frame and positioned to feed said roofing material at said application zone onto the substrate while exposing the lower surface of said roofing material at said application zone;
a lower surface heater directed at said application zone so as to heat the lower surface of said roofing material fed therethrough;
a first seam heater located at an edge of said application zone and directed generally downwardly; and
a first seam roller mounted on said frame and positioned to contact the region heated by said first seam heater after said seam heater is transported thereover, whereby said first seam roller presses the edge of the roofing material against the region heated by said first seam heater so as to form a seal thereat.

18. The applicator of claim 17, further comprising:
a sheet roller extending substantially across said application zone and disposed to contact said roofing material after said roofing material is dispensed therethrough.

19. The applicator of claim 17, further comprising:
a second seam heater located at an opposite edge of said application zone from said first seam heater, and a second seam roller mounted on said frame and disposed to contact and compress the region heated by said second seam heater after said second seam heater has been transported thereover.

20. The applicator of claim 17, further comprising:
a wind cowling on said frame and disposed to protect said application zone.

21. The applicator of claim 17, wherein:
said supply roller is slidably mounted in guide tracks.

22. The applicator of claim 21, wherein:
said lower surface heater is disposed to one side of said roofing material feed assembly, and said guide tracks angle downwardly and toward said feed assembly.

* * * * *